United States Patent
Lieberman et al.

(10) Patent No.: US 10,303,388 B1
(45) Date of Patent: May 28, 2019

(54) STORAGE FILTERING USING CONTAINER IMAGES

(71) Applicant: EMC IP Holding Company LLC, Hopkinton, MA (US)

(72) Inventors: Amit Lieberman, Kefar Sabar (IL); Jehuda Shemer, Kfar Saba (IL); Assaf Natanzon, Tel Aviv (IL); Leehod Baruch, Herzliya (IL); Ron Bigman, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 215 days.

(21) Appl. No.: 15/282,785

(22) Filed: Sep. 30, 2016

(51) Int. Cl.
G06F 3/06 (2006.01)
G06F 8/60 (2018.01)
G06F 9/455 (2018.01)

(52) U.S. Cl.
CPC .......... *G06F 3/0637* (2013.01); *G06F 3/0604* (2013.01); *G06F 3/0653* (2013.01); *G06F 3/0655* (2013.01); *G06F 3/0673* (2013.01); *G06F 8/60* (2013.01); *G06F 2009/45562* (2013.01); *G06F 2009/45587* (2013.01)

(58) Field of Classification Search
CPC . G06F 9/5077; G06F 8/60; G06F 8/63; G06F 3/0637; G06F 3/0604; G06F 3/0653; G06F 3/0655; G06F 3/0673; G06F 17/30486; G06F 21/53
See application file for complete search history.

(56) References Cited

U.S. PATENT DOCUMENTS

| | | | | |
|---|---|---|---|---|
| 6,219,693 | B1 * | 4/2001 | Napolitano | G06F 3/0611 707/E17.01 |
| 9,256,467 | B1 * | 2/2016 | Singh | G06F 9/5055 |
| 9,747,119 | B2 * | 8/2017 | Zellermayer | G06F 9/45533 |
| 2003/0225801 | A1 * | 12/2003 | Devarakonda | G06F 17/30315 |
| 2007/0050777 | A1 * | 3/2007 | Hutchinson | G06F 11/0709 718/104 |
| 2016/0381075 | A1 * | 12/2016 | Goyal | H04L 63/20 713/176 |
| 2017/0180346 | A1 * | 6/2017 | Suarez | G06F 9/45558 |
| 2017/0300697 | A1 * | 10/2017 | Iyer | G06F 21/572 |

OTHER PUBLICATIONS

Amazon DynamoDB. Developer Guide (API Version Aug. 10, 2012). <https://docs.aws.amazon.com/amazondynamodb/latest/developerguide/bp-query-scan.html>. (Year: 2012).*
OpenShift Enterprise 3.0 Documentation. "Containers and Images". Revision May 25, 2016. <https://docs.openshift.com/enterprise/3.0/architecture/core_concepts/containers_and_images.html>. (Year: 2016).*
OpenShift Enterprise 3.0 Revision History. <https://docs.openshift.com/enterprise/3.0/welcome/revhistory_full.html>. (Year: 2016).*

* cited by examiner

*Primary Examiner* — Charles Rones
*Assistant Examiner* — Hewy H Li
(74) *Attorney, Agent, or Firm* — Womble Bond Dickinson (US) LLP

(57) ABSTRACT

Management of access to data stored in a storage system is provided using container images. Specifications for a requested data scan of the storage system are received. The requested data scan is performed using a container image according to the received specifications, the container image being run on the storage system. A cost of resources is associated with the requested data scan performed using the container image. Access to data stored in the storage system is managed based on the cost of resources.

18 Claims, 3 Drawing Sheets

US 10,303,388 B1

STORAGE FILTERING USING CONTAINER IMAGES

FIELD

The disclosure herein relates generally to management of data storage resources.

BACKGROUND

Data plays an important and central role in providing value to many businesses and organizations. There are therefore often requests, from both users internal to the business and consumers external to the business, to analyze data, such that there may be many demands for access to the data at any given time and bottlenecking of a network may occur.

Some providers of cloud computing platforms provide a suite of software components (e.g., Google App Engine, OpenShift, and CloudFoundry), sometimes referred to as a software stack, that an application developer can install on a virtual machine. The software stack provides a Platform-as-a-Service (PaaS) layer that contains functionality to support the developer's application. The PaaS layer can include functionality for testing, debugging, database integration, security management, health management, incremental updates, and auto scaling of the application. In PaaS platforms, container technologies are often used to deploy application components to production. In this regard, application components may run in a container on a physical or virtual machine providing hardware virtualization. A container emulates an operating system environment. Containers allow developers to have "dev/prod parity", such that the software components deployed in production act the same as they do during development. One example implementation of containers is provided by the Docker project. The project provides a container engine that can instantiate containers on a machine and take down containers that are no longer needed.

BRIEF DESCRIPTION OF THE DRAWINGS

The embodiments of the disclosure herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
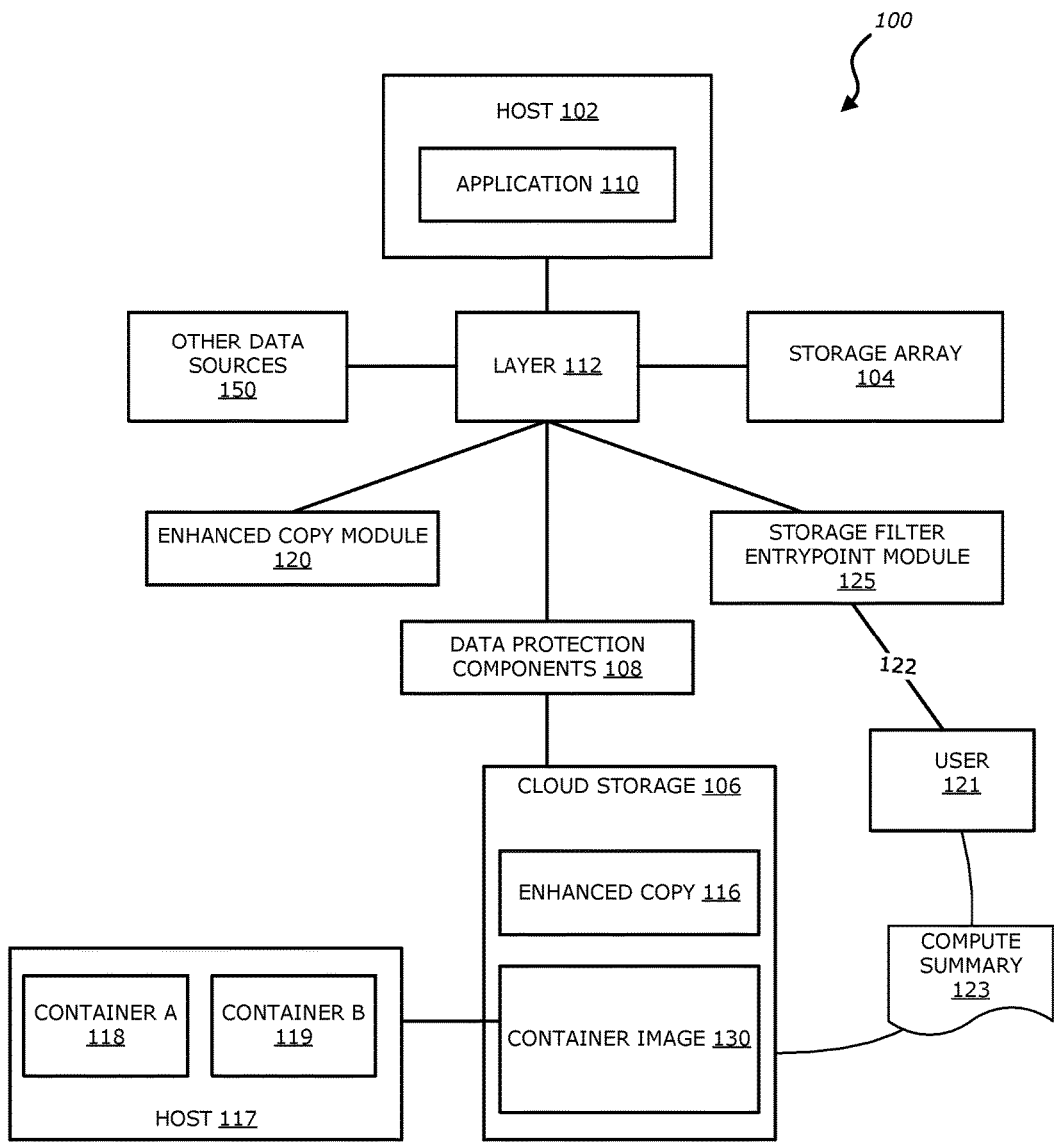
FIG. 1 is a block diagram for explaining an example system for explaining management of data storage resources according to an embodiment herein.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As used herein a "container" is a software component that hosts other software components. Typically, a container is implemented as an isolated user space instance. Software containers are sometimes referred to as virtualization engines (VE), virtual private servers (VPS) or jails. A container provides execution support to the software components it hosts in a way that is similar to an operating system hosting processes. A container can serve as a protective barrier, monitoring the interactions between hosted components and remote software components outside of the container, restricting the interactions to those that are deemed safe.

A container may be deployed on a virtual or physical machine, such as directly on a developer's laptop (referred to as a "bare metal" deployment) or on a virtual machine provided by a data center. As discussed above, certain projects provide a PaaS layer that provides a software stack having the operating system, libraries, and configuration to support an application.

A container provides the generic execution environment in which to develop and deploy an application, but also isolates the application from other applications (or even from the rest of the machine's operating system environment). Thus, two applications can run in two different containers. If the containers are on the same machine, they run as two software processes that are isolated from each other. Deploying applications in different software containers is also more efficient than deploying them in different virtual machines. For example, while the container may need to emulate an operating system environment with its own user space, file system, and memory, it may not need to emulate processing, storage, and networking resources. The container may rely on the underlying machine for such resources. Thus, a container image can be smaller than a virtual machine image and more efficient to deploy. A container image is a template of a container that may be run on one or more hosts. Often, PaaS services are described as templates of container images having relationships between them.

With respect to workload requests to access data stored in a storage system, for requests that heavily utilize the data, the inventors herein have recognized that it may be inefficient to transfer each and every block of data from the storage system over the network (e.g., storage area network (SAN) or network-attached storage (NAS)) to the consumer for execution. In this regard, such requests that heavily utilize data may result in various problems. For example, a heavy load may be created on the network. In addition, a heavy load may be created on the storage system, particularly if there are multiple requests to access the data. The inventors herein have also recognized that, in many cases, a user (internal or external) is granted access to the data on the storage system and it is difficult to control the amount of load the user creates on the network or on the storage system, both with respect to maintaining the system help and in cases where the system would like to charge the user according to use. In this regard, it may be difficult to measure or monitor the amount of resources utilized by a user's requests, such that it isn't possible for the system to charge the user according to use.

Generally, the present disclosure relates to management of storage system resources and of access to data stored in the storage system. According to one embodiment, specifications for a requested data scan of a storage system are received. The received specifications may include information indicating whether the requested data scan is a request to scan all of the data stored in the storage system (e.g., sequentially read data from an entire disk, an entire logical unit number (LUN), an entire storage array, etc.), rather than a request for random access to the data. Such a sequential scan of an entire disk often utilizes a large amount of system resources, since the entire disk must be scanned and the data must be transferred out of the storage system. The received specifications may also include information indicating whether the requested data scan is of current data or of data obtained at a previous point in time. The received specifications may also indicate the location of the data to be scanned, such as a primary storage, a secondary storage or a backup storage. Some examples in which it may be desirable to scan large batches of data include antivirus scans, backup, replication, searches, deduplication processes and map reduce analytics queries, government regulation scans.

In one embodiment, the requested data scan is performed using a container image according to the received specifications, the container image being run on the storage system. A cost of resources is associated with the requested data scan performed using the container image and access to data stored in the storage system is managed based on the cost of resources.

In one aspect, a received workload request is run on the storage system itself, in order to reduce the amount of traffic over the network.

In one aspect, a compute summary may be sent to the user (e.g., consumer) that issued the workload request, the compute summary may be used to control the amount of data to be transferred out of the storage system to the user based on the associated cost of resources.

In one aspect, a limit may be placed on the consumption of resources. For example, in one embodiment, for a container image, limits may be assigned with respect to CPU consumption and/or bandwidth consumption. In one embodiment, such consumption limit is assigned on a user basis.

In one aspect, only data that is granted is mounted into a container image, where the data is granted based on the compute summary and/or the consumption of resources.

In one aspect, it is determined whether to transmit a particular container image and workload to a primary storage or to a secondary storage included in the storage system based on the associated cost of resources. In cases in which the container image and workload are transferred to the secondary storage, it is possible to remove the load that would otherwise have been placed on the primary storage, which is often expensive and overused. Also in cases in which the container image and workload are transferred to the secondary storage, in one embodiment, deduplication or other data manipulations may be performed.

By virtue of the embodiments discussed herein, it is typically possible for owners of data stored on premise (e.g., on a server) or in a cloud storage to expose data in a consumable manner such that monetization is possible. In addition, it is possible to easily measure cost according to resource utilization and value of the data.

FIG. 1 illustrates a block diagram for explaining an example system for managing storage system resources as well as access to the storage system according to an embodiment herein. Referring to FIG. 1, the system 100 includes a host 102, a storage array 104, a cloud storage 106, data protection components 108, a layer 112 and other data sources 150 (e.g., object stores, databases, volumes and so forth). The host 102 includes an application 110. The storage array 104 may include a primary storage and a secondary storage.

In one embodiment, the system 100 includes an entrypoint module 125. While the entrypoint module 125 is shown as a separate block in FIG. 1, entrypoint module 125 may be located anywhere in system 100 including being in the layer 112. Entrypoint module 125 is constructed to receive a workload request 122 from a user 121, for example, a request to perform a data scan (e.g., sequential reading of data) on an entire disk. The workload request may include specifications, such as whether the search is to be performed by a sequential read of all of the data stored in the storage system (e.g., an entire disk, an entire logical unit number (LUN), an entire storage array). Other specifications may include how recent the data should be (e.g., current data, offline data, etc.), the physical requirements needed (e.g., memory, CPU) and the location of the data to be accessed (e.g., primary storage, secondary storage, backup storage, cloud storage, etc.) The entrypoint module 125 selects a storage system included in storage array 104 and transmits the container image 130 to the selected storage system. The container image 130 is then run on the selected storage system of the storage array 104.

In one example, the layer 112 includes at least one of a block storage API (application programming interface), an object storage API, a key/value API, a file system API, a database API and a messaging API. In one embodiment, storage array 104 (or individual storage systems included in the storage array) includes a standard API for receiving the workload request and orchestrating execution of the request. Thus, an embedded storage system execution engine is provided. In one embodiment, execution of the request is performed using container image 130 being run on storage array 104, and utilization information is associated with the requested workload. This utilization information may include a cost of the resources (e.g., CPU consumption, bandwidth consumption) used in executing the workload request. The utilization information is stored and sent to the user that requested the workload. In one embodiment, a compute summary 123 may be sent to the user 121, and the compute summary 123 may be used to control the amount of data to be transferred out of the storage system to the user 121 based on the associated utilization information. In one embodiment, access to data stored in the storage system is managed based on the utilization information. As one example, a limit may be placed on CPU consumption and/or bandwidth consumption. In one embodiment, such consumption limit is assigned on a per-user basis based on the utilization information. As another example, only data that is granted based on the compute summary 123 and/or the utilization information is mounted into a container image 130. As another example, based on the utilization information, it is determined whether the entrypoint module 125 should transmit the container image 130 and workload request to a primary storage system or to a secondary storage system included in the storage array 104 or to a long-term backup storage located in cloud storage 106 or on tape. In one embodiment, entrypoint module 125 sends the container image 130 to the most appropriate storage from the primary storage, the secondary storage and the backup storage according to the data being requested for scan. In some cases, the utilization information may indicate that a higher cost of resources is associated with accessing data stored in a primary storage as compared to a secondary storage. In cases in which the container image 130 and workload request are transferred to the secondary storage, it is possible to remove the load that would otherwise have been placed on the primary storage, which is often expensive and overused. Also in cases in which the container image and workload are transferred to the secondary storage, in one embodiment, deduplication or other data manipulations may be performed. In an embodiment, the container image 130 is a template of a container container A 118 and container B 119) that may be run on one or more hosts (e.g., host 117).

In one aspect, a user may select a software stack within the container image 130 to be used to scan data stored in a storage system. Accordingly, the owner of the data to be scanned (e.g., a business) does not have to specifically support the selected software stack.

As previously mentioned, the container image 130 may be run on the storage array 104. As such, the storage array 104 may inspect the container image 130 and the actions being performed by the container image 130. In one embodiment, the storage array 104 may perform a security check on the container image 130 and reject a workload if a risk is indicated.

In one embodiment, a user may select its own encryption method between the host and the container image, and decryption is performed inside the container image before IOs (inputs and outputs) are passed to the storage system. As such, the user doesn't have to rely on the security protocol of storage array 104.

By running the container image 130 on the storage array 104, it is possible for the container image 130 to access the data locally, such that the contents of the disk to be scanned does not need to be transferred over the network. In addition, by using container image 130, it is possible to implement the data storage management process without limiting a choice of operating system that may be user by the user. Moreover, it is possible to implement the data storage management process using the container image 130 to monitor the data scan requests and the utilization of resources in order to enable control of access to the data.

System 100 also includes an enhanced copy module 120 constructed to generate an enhanced copy 116. While the enhanced copy module 120 is shown as a separate block in FIG. 1, in other examples, the enhanced module 120 may be located anywhere in system 100 including being in the layer 112. Cloud storage 106 stores the enhanced copy 116. An enhanced copy 116 includes application data and other data to be able to regenerate data. For example, other data may include the application and the whole operating environment which may include run time environment, run time parameters, data, data copies and any other data needed for the application 110 to operate. Accordingly, the enhanced copy 116 may include application data, the application, application configuration and runtime settings. For example, the enhanced copy 116 may include an executable image of a particular version that was running at the time of the copying, application data that was being accessed by the application, and application metadata describing the circumstances of the application and the application data. In some examples, application data is a consolidation copy of data sources of the application. These data copies may be generated using existing backup/replication technologies or any other method and are in some examples a set of different copies of different sources.

With respect to application metadata, in some embodiments, the enhanced copy 116 further includes metadata including metadata on application operational parameters (which describe how to run the application), number of instances, scale out parameters, and availability information. The application metadata may describe an operating environment that hosted the application (e.g., a processor, a memory, a storage device, a network interface, etc. involved at the time). In one embodiment, metadata includes parameters to connect to additional resources, such as databases, object stores, data volumes, file systems, or any service that application was consuming at the time. In some embodiments, the metadata may further include metadata providing information about resources used by the application, for example IDs, names, and/or types. In one embodiment, the metadata further includes metadata controlling the execution of the application at the time. In another example, the metadata further includes metadata related to enhanced copy 116 itself, for example the timestamp, sizes, technologies, and compression/archiving types. In some embodiments, the application metadata may further include parameters controlling whether to restore all of the above features/services, or partial of the features/services, restore only the data instead of the executable image of the application. The parameters may also control the way the runtime environment is set up. For example, a restoration for a development environment may not restore all the runtime services or may restore them at a lower service level agreement (SLA), etc.

In some examples, the application itself is stored to be able to restore and access the data with the correct application version of a particular point in time, which according to one embodiment includes the application itself and the applications that generated the data copies. In some example embodiments, the application configurations enable the application to be run from the enhanced copy. In some examples, runtime settings enable the environment to be mimicked, including allocation of proper processing resources (e.g., processor, memory, storage, operating system, network stack, proper system clock). Certain services that were utilized or connected with may also be restored based on the application metadata. It is therefore possible to restore a full working copy of the application of a particular point in time, rather than just the application data. According to one example, when an application is restored, an operating environment or execution environment will be established and configured based on the application metadata, including allocating proper resources, even setting up a system clock reflecting the time of the capture and copying. A virtual machine may be provisioned and configured based on the application metadata, which mimics substantially the same operating environment at the time of the copying or capturing of the corresponding snapshot. An executable image of the application is then executed within the operating environment and the application data is loaded into the memory and accessible by the application. It is therefore advantageously possible create a copy of the application in which the configurations, settings and environment (including clocks) appear to the developer to be moved back to those of the run time environment at the time of interest (e.g., the time at which the problem or bug was detected), even if available services have changed or been removed. In fact, it becomes possible to provide the developer with a copy of the application where the environment is identical to the environment at the time of the problem or bug.

Note that some or all of the components as shown and described above (e.g., entrypoint module 125) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
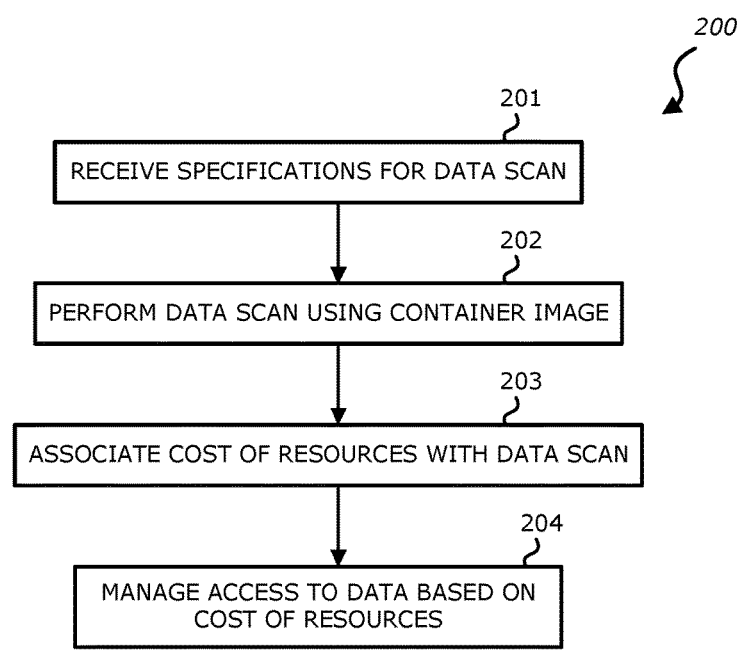
FIG. 2 is a flow diagram for explaining an example method for management of access to a storage system according to an embodiment herein.

FIG. 2 illustrates a flow diagram for explaining an example process for determining utilization information (e.g., cost of resources) associated with a workload request and for managing access to data stored in a storage system (such as storage array 104) according to an embodiment herein. In this regard, the following embodiments may be described as a process 200, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 200 may be performed by processing logic that includes hardware (e.g. circuitry, dedicated logic, etc.), software (e.g., embodied on a non-transitory computer readable medium), or a combination thereof.

Referring to FIG. 2, at block 201 specifications for a requested data scan of a storage system are received, for example, by entrypoint module 125 shown in FIG. 1. The received specifications may include information indicating whether the requested data scan is a request to scan all of the data stored in the storage system (e.g., an entire disk, an entire logical unit number (LUN), an entire storage array). The received specifications may also include information indicating whether the requested data scan is of current data or of offline data stored in a backup.

At block 202, according to the received specifications, a sequential read of the data as requested by the requested data scan is performed by a container image, the container image (e.g., container image 130) being run on the storage system (e.g., a storage system included in storage array 104).

At block 203, a cost of resources is associated with the requested data scan and access to data stored in the storage system is managed based on the cost of resources at block 204. In this way, it is possible to quantify an amount of network resources utilized in executing the workload request. In one embodiment, the amount of utilized resources is quantified at block 203 with respect to each action of the workload request. This quantified utilization information may be used to generate a compute summary that may be sent to the user, and the compute summary may be used to control the amount of data to be transferred out of the storage system to the user based on the associated utilization information at block 204. This quantified utilization information may also be used to place a limit on the resources that may be used by a given workload request at block 204. This quantified utilization information may further be used to determine a storage (e.g., primary, secondary, backup, etc.) to transmit the container image and the workload request at block 204.

Figure 3:
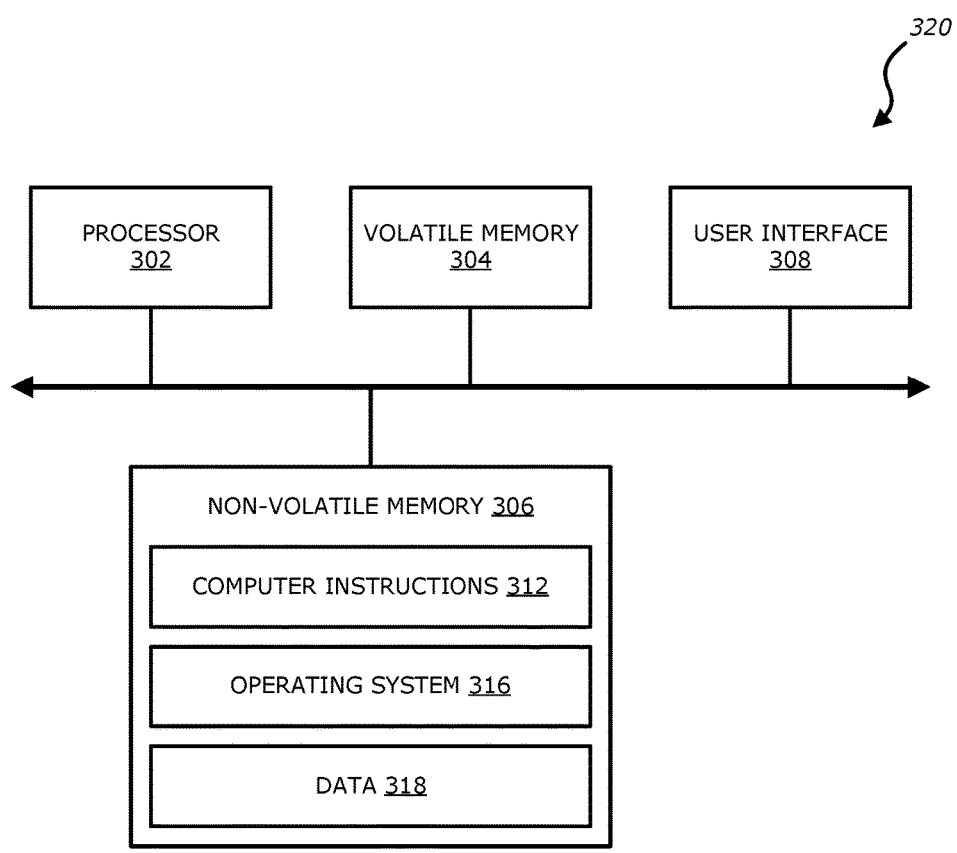
FIG. 3 is a block diagram for explaining an example data processing system on which any portion of the process of FIG. 2 may be implemented according to an embodiment herein.

FIG. 3 illustrates a block diagram of an example of a data processing system which may be used with one embodiment herein. For example, system 320 may represent any of data processing systems described above performing any of the processes or methods described above. System 320 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 320 is intended to show a high level view of many components of the computer system. However, it is to be understood that additional components may be present in certain implementations and furthermore, different arrangement of the components shown may occur in other implementations. System 320 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 320 includes a processor 302, a volatile memory 304, a non-volatile memory 306 (e.g., hard disk) and a user interface (UI) 308 (e.g., a graphical user interface, a mouse, a touch pad, a touch sensitive screen, a display, a pointer device such as a stylus, a keyboard, and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200). In addition, executable code and/or data of a variety of operating systems, device drivers, firmware (e.g., input output basic system or BIOS), and/or applications can be loaded in the memory and executed by processor 302.

In one embodiment, system 320 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 320

To provide for persistent storage of information such as data, applications, one or more operating systems and so forth, a mass storage (not shown) may also couple to processor 302. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 302, e.g., via a serial peripheral interface (SPI). This flash device may provide for non-volatile storage of system software, including a basic input/output software (BIOS) as well as other firmware of the system.

Processor 302 may represent a single processor or multiple processors with a single processor core or multiple processor cores included therein. Processor 302 may represent one or more general-purpose processors such as a microprocessor, a central processing unit (CPU), or the like. More particularly, processor 302 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 302 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 302, which may be a low power multi-core processor socket such as an ultra-low voltage processor, may act as a main processing unit and central hub for communication with the various components of the system. Such processor can be implemented as a system on chip (SoC).

According to one example embodiment, entrypoint module 125 is stored in non-volatile memory 306 and is executed by the processor 302 to cause system 320 to function in accordance with the techniques discussed herein.

FIG. 3 is merely one example of a particular implementation and is merely intended to illustrate the types of components that may be present in the system 320. Note that while system 320 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

The processes described herein are not limited to the specific examples described. For example, process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 200 can be implemented in any combination hardware devices and software components.

Embodiments of the present invention are not described with reference to any particular programming language. It will be appreciated that a variety of programming languages may be used to implement the teachings of embodiments of the invention as described herein.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method comprising:
 receiving specifications for a requested data scan of a storage system;
 performing the requested data scan using a container image according to the received specifications, the container image being run on the storage system;
 determining a cost of resources used in executing the requested data scan performed using the container image;
 using the container image to monitor the cost of resources;
 managing access to data stored in the storage system based on the cost of resources, wherein managing access to the data includes determining whether to transmit the container image and the requested data scan to a primary storage or to a secondary storage based on the cost of resources; and
 in response to determining that the container image and the requested data scan are to be transferred to the secondary storage, removing a workload scheduled for the primary storage from the primary storage.

2. The method of claim 1 wherein the received specifications include whether the requested data scan is a request to scan all of the data in the storage system and whether the requested data scan is for current data or data stored in a backup.

3. The method of claim 1 wherein managing access to the data further comprises sending information to a user that requested the data scan based on the cost of resources, the information controlling an amount of data to be transferred from the storage system to the user.

4. The method of claim 1 wherein managing access to the data further comprises limiting, based on the cost of resources, an amount of resources that may be consumed due to performance of the requested data scan, wherein the resources include central processing unit (CPU) consumption and bandwidth consumption.

5. The method of claim 1 wherein determining whether to transmit the container image and the requested data scan to a primary storage or to a secondary storage, the primary and secondary storages being included in the storage system, is further based on the received specifications for the requested data scan.

6. The method of claim 1 wherein the storage system performs a security check on the container image and causes the requested data scan to be rejected if the security check indicates a risk.

7. A data processing system comprising:
 electronic hardware circuitry constructed to:
  receive specifications for a requested data scan of a storage system;
  perform the requested data scan using a container image according to the received specifications, the container image being run on the storage system;
  determine a cost of resources used in executing the requested data scan performed using the container image;
  use the container image to monitor the cost of resources;
  manage access to data stored in the storage system based on the cost of resources, wherein managing access to the data includes determining whether to transmit the container image and the requested data scan to a primary storage or to a secondary storage based on the cost of resources; and
  in response to determining that the container image and the requested data scan are to be transferred to the secondary storage, remove a workload scheduled for the primary storage from the primary storage.

8. The data processing system of claim 7 wherein the received specifications include whether the requested data scan is a request to scan all of the data in the storage system and whether the requested data scan is for current data or data stored in a backup.

9. The data processing system of claim 7 wherein managing access to the data further comprises sending information to a user that requested the data scan based on the cost of resources, the information controlling an amount of data to be transferred from the storage system to the user.

10. The data processing system of claim 7 wherein determining whether to transmit the container image and the requested data scan to a primary storage or to a secondary storage, the primary and secondary storages being included in the storage system, is further based on the received specifications for the requested data scan.

11. The data processing system of claim 7 wherein managing access to the data further comprises determining whether to transmit the container image and the requested data scan to a primary storage or to a secondary storage, the primary and secondary storages being included in the storage system, based on the received specifications for the requested data scan.

12. The data processing system of claim 7 wherein the storage system performs a security check on the container image and causes the requested data scan to be rejected if the security check indicates a risk.

13. A non-transitory computer-readable storage medium storing computer-executable instructions, the instructions causing a machine to execute a process comprising:
 receiving specifications for a requested data scan of a storage system;
 performing the requested data scan using a container image according to the received specifications, the container image being run on the storage system;
 determining a cost of resources used in executing the requested data scan performed using the container image;
 using the container image to monitor the cost of resources;
 managing access to data stored in the storage system based on the cost of resources, wherein managing access to the data includes determining whether to transmit the container image and the requested data scan to a primary storage or to a secondary storage based on the cost of resources; and
 in response to determining that the container image and the requested data scan are to be transferred to the secondary storage, remove a workload scheduled for the primary storage from the primary storage.

14. The non-transitory computer-readable storage medium of claim 13 wherein the received specifications include whether the requested data scan is a request to scan all of the data in the storage system and whether the requested data scan is for current data or data stored in a backup.

15. The non-transitory computer-readable storage medium of claim 13 wherein managing access to the data further comprises sending information to a user that requested the data scan based on the cost of resources, the information controlling an amount of data to be transferred from the storage system to the user.

16. The non-transitory computer-readable storage medium of claim 13 wherein managing access to the data further comprises limiting, based on the cost of resources, an amount of resources that may be consumed due to performance of the requested data scan, wherein the resources include central processing unit (CPU) consumption and bandwidth consumption.

17. The non-transitory computer-readable storage medium of claim 13 wherein determining whether to transmit the container image and the requested data scan to a primary storage or to a secondary storage, the primary and secondary storages being included in the storage system, is further based on the received specifications for the requested data scan.

18. The non-transitory computer-readable storage medium of claim 13 wherein the storage system performs a security check on the container image and causes the requested data scan to be rejected if the security check indicates a risk.

* * * * *